April 17, 1945.  E. PALMER  2,373,849
APPARATUS FOR APPLYING TREATING OR COATING MATERIALS TO PAPER
Filed Sept. 7, 1942
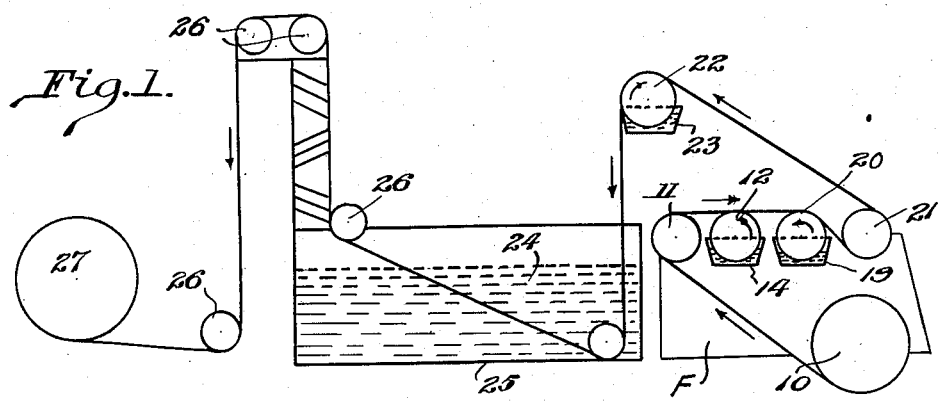
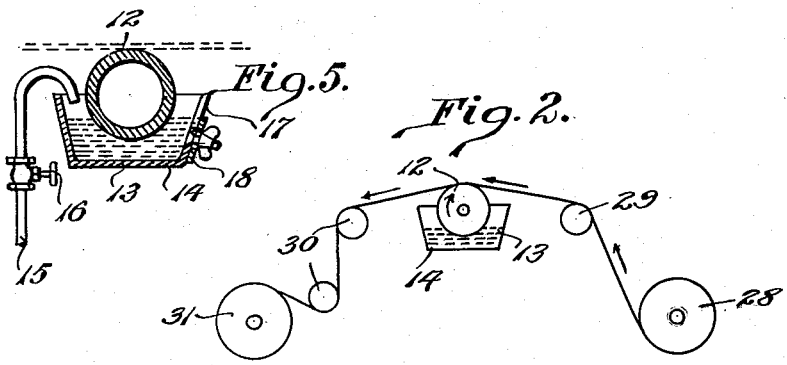
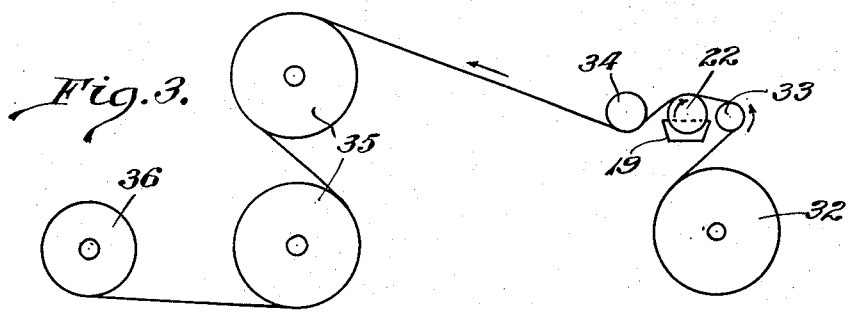
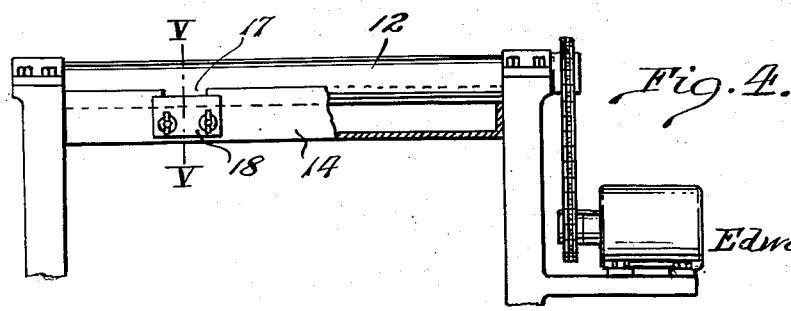
Inventor
Edward Palmer
By W. D. McHowell
Attorney Patented Apr. 17, 1945

2,373,849

UNITED STATES PATENT OFFICE 2,373,849

APPARATUS FOR APPLYING TREATING OR COATING MATERIALS TO PAPER

Edward Palmer, Columbus, Ohio, assignor to Ohio Wax Paper Company, Columbus, Ohio, a corporation of Ohio Application September 7, 1942, Serial No. 457,576

2 Claims. (Cl. 91—51)

This invention relates to an improved means for applying fluids to paper, having particular reference to the application of coating or dampening fluids to paper in order to condition the latter for various uses. In certain of its more specific aspects the invention is directed to the manufacture of wax-coated paper, although it is not limited thereto.

In the application of various coating or treating materials to paper, it is the accepted practice to apply an excess of such materials and thereafter to remove such excess by passing the paper between squeeze rolls, or mechanical scrapers, in order that the desired amount of treating or coating material may be retained on the paper.

In accordance with the present invention, I provide a means for coating or treating paper wherein the coating or treating material is applied in precisely the quantity necessary to obtain the required deposit thereof on one or more surfaces of the paper stock, the operation being such as to evenly and uniformly distribute the coating or treating materials over the surface or surfaces of the paper undergoing treatment. Moreover, I accomplish these ends without waste of the treating or coating materials and in an expeditious and economical manner, utilizing simple, readily controlled and inexpensive apparatus.

In carrying out the invention, I utilize primarily one or more horizontally journaled metallic rolls by means of which the treating or coating material in a fluid state is applied to the surface of a paper web traveling longitudinally across the upper peripheral surface of the roll. Each of said rolls is adapted to have its lower peripheral portion immersed in a fluid treating or coating material maintained at predetermined levels in a pan therefor. The depth of immersion of the roll in the treating fluid controls, in part, the quantity of the fluid material delivered to the surface of the traveling paper web. Other important factors controlling the amount of coating or treating fluid applied to the paper resides in the rate of travel of the paper across the upper periphery of the pan roll and the rotational speed or R. P. M. of the pan or coating roll. Stated in another manner, I have found that when the roll is rotated slowly as compared with the rate of travel of the paper across the same, and in a direction opposed to that of the paper, accurate control of the quantity of treating or coating materials applied to the paper is obtainable, together with an even distribution of such materials on the paper.

For further understanding of the invention reference is to be had to the following description and the accompanying drawing, wherein:

Fig. 1 represents, more or less diagrammatically, one form of apparatus for carrying out the invention;

Fig. 2 is a similar view disclosing apparatus for the dampening of paper prior to waxing the same;

Fig. 3 is a diagrammatic view of the apparatus adapted for applying wax coating materials to one side of a paper strip;

Fig. 4 is a front elevational view of the pan and coating roll;

Fig. 5 is a vertical transverse sectional view taken on the line V—V of Fig. 4.

In the apparatus illustrated in Fig. 1 an arrangement of parts is provided adapted for the application of wax to both sides of a web or roll of paper. The apparatus embodies a suitable frame F which effects the support of a paper roll 10. When a sheet or web of paper is withdrawn from this roll it is trained, first, over a guide roll indicated at 11. From this guide roll the paper web is then passed over the upper peripheral surface of a water-applying roll 12. The roll 12 is preferably of metal, possessing an elongated cylindrical configuration, the ends thereof being received within suitable bearings supported in connection with the frame F of the machine so that the roll is journaled for rotation in a horizontal plane, with its lower peripheral portion immersed, approximately one-fourth of an inch, in a body of water 13, contained in an elongated stationary pan 14. The latter is suitably supported in connection with the frame of the machine and is customarily supplied with water by means of the pipe line indicated at 15, in which is arranged a flow-control valve 16. The level of the water within the pan is rendered regulatable by means of an overflow weir 17, which includes an adjustable plate 18. By raising or lowering the plate 18 the degree of immersion of the roll 12 in the water may be controlled and in this manner the amount of water applied to the paper stock may be, in part, likewise regulated.

In the wax coating of papers, particularly, it is often desirable to dampen the paper stock prior to the application of the wax coating. It has been found that when wax coated papers have been so dampened, the same are far more pliable when placed into various industrial or practical uses, than if left undampened. Undampened wax paper possesses undesirable stiffness or rigidity, so that when such papers are used for various wrapping purposes, the same do not flex or fold readily around various objects to which the paper may be applied. Moderate dampening of the paper prior to waxing overcomes this objection in a very satisfactory manner. However, it is important that the dampening should be carefully regulated so that the required amount of moisture only may be applied to the paper, and this accomplished in a uniform and properly distributed manner. Heretofore, in such dampening machines, use has been made of brush or bristle type rolls. With such rolls considerable difficulty has been encountered in the manner of controlling the amount of water applied to the paper, and, furthermore, the bristles tend to apply the water unevenly, certain parts of the paper receiving considerable more water than others, causing the production of an inferior product. By the smooth single roll applicator, indicated at 12, I am enabled to provide a means for applying water in proper amounts to the paper and to effect the even distribution thereof, as in tub sizing.

As an important part of my invention the roll 12 is rotated at a much lower rate of speed than the rate of linear travel of the paper web across and in contact with its upper periphery. Utilizing a roll having an outside diameter of four inches I have found it advantageous to rotate this roll at a rate so that its circumferential speed will be approximately one-twenty-fourth that of the linear rate of travel of the paper web. Another important feature of my invention resides in rotating the roll 12 in a direction opposed to the direction of travel of the paper web, as indicated by the arrows in Fig. 1. By these means an even and uniform distribution of water over the paper web takes place. The water supply is completely utilized and absorbed by the paper, leaving the outer surface of the roll, after it is freed from contact with the paper, dry and devoid of moisture film, thereby indicating the elimination of excess treating material.

A similar arrangement is employed for applying wax to the paper. Thus there may be arranged adjacent to and parallel with the pan 14 a second pan 19 in which may be contained a body of fluid wax kept at a temperature of approximately 170° F. The level of the molten wax in the pan is maintained by the use of a weir similar to that disclosed at 17, so that the desired degree of immersion of the lower peripheral portion of the frame-supported wax-applying roll 20 in the molten wax may be obtained, just as in the manner of the dampening roll 12, and for similar reasons.

The roll 20 also rotates in a direction opposed to the direction of movement of the paper web. With the use of the roll 20 wax in the required amount is applied to the under surface of the web.

When the paper is to be coated with wax on both sides, the paper web after passing over the roll 20 is directed over an idler roll, shown at 21, and is then trained upwardly and angularly over a second wax-applying roll 22, in order that the opposite side of the paper web may be coated with wax. The roll 22 has its lower periphery immersed in a molten wax body maintained at a constant level with a stationary open-topped pan 23 supported by the frame of the machine and above the rolls 12 and 20, the roll 22 functioning in precisely the same manner as the roll 20 or the roll 12.

Following the application of wax to both surfaces of the paper, the latter is then drawn downwardly into a body of cool water 24 contained in a tank 25 and by means of which the wax is chilled and set. From the tank 25 the paper is passed over suitable guide rolls indicated at 26 and finally delivered to a rewind roll 27.

It will be appreciated that if desired the dampening mechanism may be embodied in a machine separate from the wax coating machine, as shown in Fig. 2. Such an installation is often useful where a manufacturer of waxed paper possesses independent waxing machines. Thus in Fig. 2 the roll 12 is mounted in an independent frame. The paper to be moistened is withdrawn from a horizontal journaled roll 28, passed over an idler roll 29 and thence drawn over the upper peripheral portion of the roll 12. After being moistened the paper is then passed over guide rolls 30 and delivered to a rewind roll 31.

Similarly, the invention may be embodied in an independent wax-coating machine in which primary dampening may or may not be performed, as shown in Fig. 3. In this figure paper is withdrawn from the roll shown at 32 and is passed over a guide 33 and thereafter trained over the upper peripheral portion of the wax applying roll 22. From the roll 22 the paper is passed over an idler 34 and then trained over a pair of rotatable drums 35, being finally delivered to a rewind roll 36. The drums 35 may be either heated, maintained at normal temperatures, or chilled, depending upon the characteristics of the wax applied by the roll 22.

The apparatus illustrated may be used in other capacities, such as in the surface coating of papers. Such coating or materials frequently comprise clay, casein, calcium carbonate, barium sulphate, and the like. Such coating materials are commonly employed for governing the opacity of paper and to improve its color. Where such coating materials contain abrasives, I have found it advisable to reciprocate the coating-applying roll in its journals, in order to prevent the scoring of the roll and cause the same to wear evenly.

In view of the foregoing it is seen that the present invention provides a simple, efficient and effective means for controlling the application of various treating and coating materials to paper. The apparatus is essentially simple and when properly adjusted may be used for sustained periods of operation without requiring any further manual attention.

While my invention is particularly adapted to the operations of dampening and coating paper, particularly wax paper, it is to be understood that the same is readily adapted for other industrial uses, wherein various substances are adapted to be applied in measured amounts to linear movable webs.

What I claim is:

1. Apparatus for applying fluid treating and coating materials to paper comprising a rotatably supported primary roll, a rotatably supported rewind roll, guide rolls mounted between said primary and rewind rolls and over which paper drawn from said primary roll is trained for substantially linear travel during passage thereof to the rewind roll, a pair of pans, one of said pans containing water and the second pan containing wax in a molten state, an applicator roll positioned in registration with each of said pans with the lower portions thereof immersed in said fluids and the upper portions thereof disposed for wiping contact with the under surface of the advancing paper web, means for maintaining the fluids in said pans at constant working levels, and means for positively driving each of the applicator rolls in a direction opposed to that of the movement of the paper web and at a substantially lower rate of peripheral speed than the rate of linear travel of the paper web thereover.

2. Apparatus for applying fluid treating and coating materials to paper comprising a rotatably supported primary roll, a rotatably supported rewind roll, guide rolls mounted between said primary and rewind rolls and over which paper drawn from said primary roll is trained for substantially linear travel during passage thereof to the rewind roll, a pair of pans, one of said pans containing water and the second pan containing wax in a molten state, an applicator roll positioned in registration with each of said pans with the lower portions thereof immersed in said fluids and the upper portions thereof disposed for wiping contact with the under surface of the advancing paper web, means for maintaining the fluids in said pans at constant working levels, means for positively driving each of the applicator rolls in a direction opposed to that of the movement of the paper web and at a substantially lower rate of peripheral speed than the rate of linear travel of the paper web thereover, and a tank positioned between said primary and rewind rolls adapted for the reception of a liquid coolant through which the paper web is drawn following coaction with said applicator rolls.

EDWARD PALMER.